United States Patent [19]

Christ et al.

[11] 4,404,724
[45] Sep. 20, 1983

[54] HYDROSTATIC SUPPORT ELEMENT, ESPECIALLY FOR A CONTROLLED DEFLECTION ROLL

[75] Inventors: Alfred Christ; Johann Miesch, both of Zürich, Switzerland

[73] Assignee: Escher Wyss Limited, Zürich, Switzerland

[21] Appl. No.: 242,121

[22] Filed: Mar. 9, 1981

[30] Foreign Application Priority Data

Mar. 25, 1980 [CH] Switzerland .................. 2320/80

[51] Int. Cl.³ .................. B21B 13/02; F16C 33/74; F16C 32/06
[52] U.S. Cl. .................. 29/116 AD; 308/5 R; 384/99; 384/100; 384/119; 384/121
[58] Field of Search .................. 308/5 R, 9, 20, 36.3, 308/93, 122, 123, 107, 170, DIG. 1; 29/116 AD, 116 R; 384/121, 122, 123, 124, 111, 100, 119, 99

[56] References Cited

U.S. PATENT DOCUMENTS

| | | |
|---|---|---|
| 3,799,628 | 3/1974 | Van Gaasbeek et al. .......... 308/5 R |
| 4,149,759 | 4/1979 | Miller ........................ 308/9 |
| 4,282,639 | 8/1981 | Christ et al. .................. 29/116 AD |
| 4,306,754 | 12/1981 | Kraus ........................ 308/9 |

*Primary Examiner*—Stuart S. Levy
*Assistant Examiner*—Thomas R. Hannon
*Attorney, Agent, or Firm*—Werner W. Kleeman

[57] ABSTRACT

A hydrostatic support or pressure element, especially for a controlled deflection roll, comprising a sealing or closing ledge having a sealing surface which closes a gap between a plunger of the support element and the supported part in a manner such that mixed friction prevails at the sealing surface of the sealing ledge. The sealing surface has a width which at most amounts to ten or five millimeters, respectively. The hydraulically effective surface of the plunger, producing a contact or press force for the sealing surface, is equal to a surface whose boundary line extends within the sealing surface, and specifically, preferably at a distance of 0.2 to 0.5-fold of the width of the sealing surface from the inner edge of the sealing surface.

10 Claims, 11 Drawing Figures

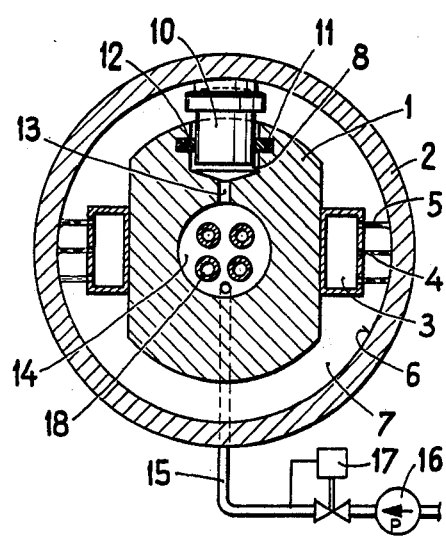
Fig. 1
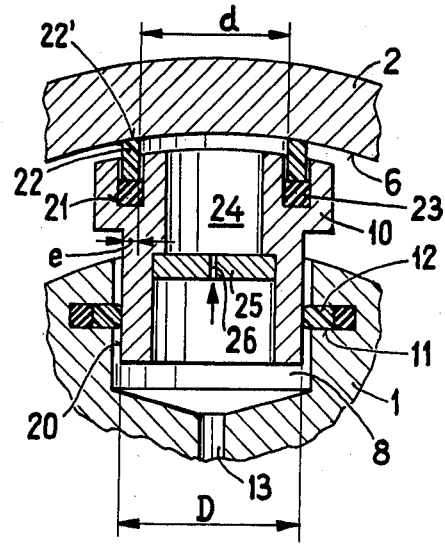
Fig. 2
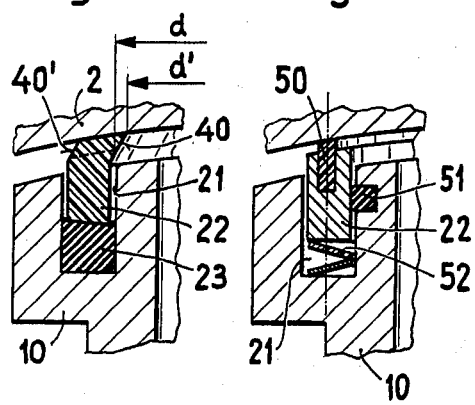
Fig. 4  Fig. 5
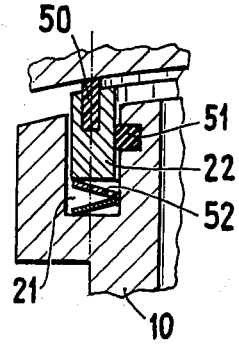
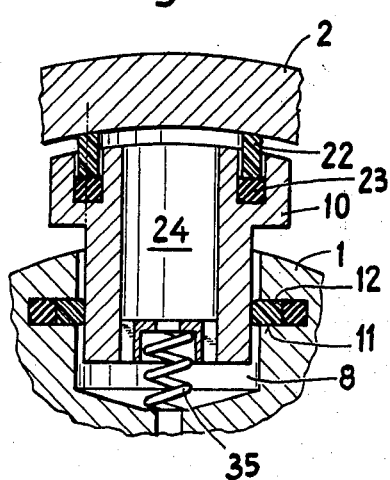
Fig. 3
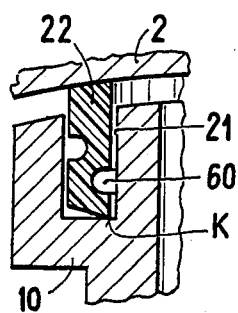
Fig. 6
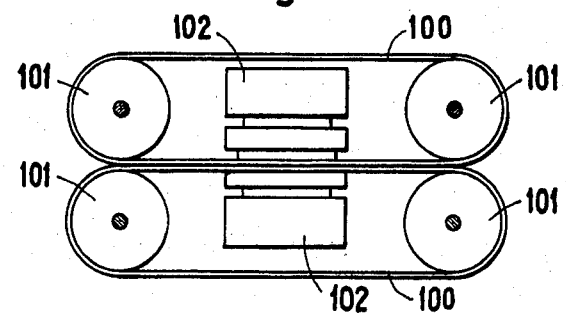
Fig. 11

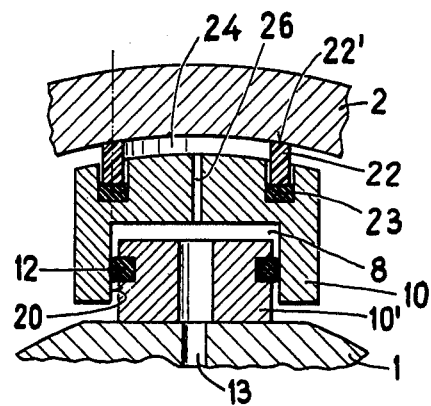
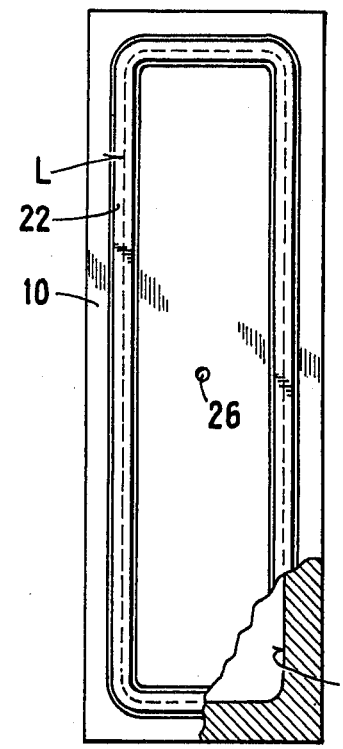
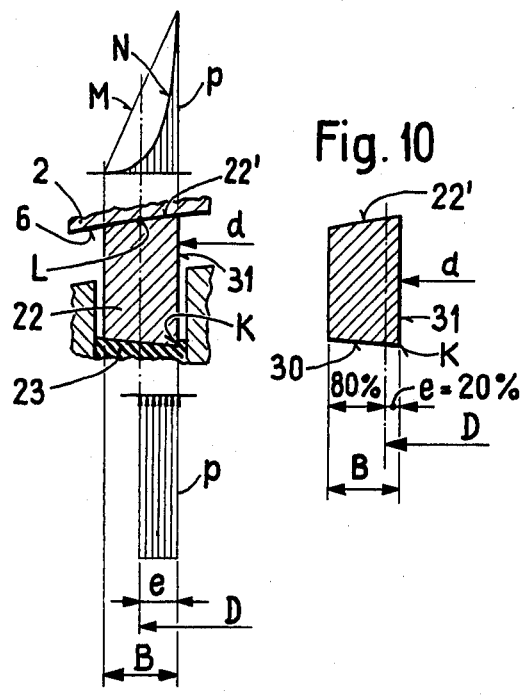

HYDROSTATIC SUPPORT ELEMENT, ESPECIALLY FOR A CONTROLLED DEFLECTION ROLL

BACKGROUND OF THE INVENTION

The present invention relates to a new and improved construction of a hydrostatic support or pressure element, especially for a controlled deflection roll, sometimes referred to in the art as a roll with bending or sag compensation.

Generally speaking, the hydrostatic pressure or support element which serves to support a supported part upon a supporting part, contains a plunger or punch or the like which is movable in the supporting part in a displacement or lift direction and encloses in conjunction with such supporting part a hydrostatic pressure chamber or space. The pressurized fluid medium of the pressure chamber acts directly upon a running surface of the supported part, and the plunger possesses a closure ledge which encloses the pressure chamber. The closure ledge has a surface coacting with the running or travel surface of the supported part.

A hydrostatic support or pressure element of this type is known to the art from U.S. Pat. No. 3,137,530, especially FIG. 3. This support or pressure element is intended, in the first instance, for supporting machine components movable within linear guides, for instance at machine tools. During operation the plunger is moved, under the influence of the pressurized fluid medium effective in the pressure chamber, against the supported part until it impacts against a stop in the supporting part which prevents any further movement of such plunger. Thereafter, the pressurized fluid medium flows through a bearing gap between the closure ledge and the running surface of the supported part towards the outside, resulting in an appreciable consumption of the pressurized fluid medium. The bearing gap is formed during operation by virtue of the pressure of the pressurized fluid medium.

SUMMARY OF THE INVENTION

It is a primary of the present invention to improve upon the heretofore known support or pressure element with the intent of devising a support element having an appreciably smaller consumption of hydraulic pressurized fluid medium, and therefore is extremely suitable for employment in controlled deflection rolls, especially those which are heated by hot oil.

A further significant object of the present invention aims at providing a new and improved construction of a hydrostatic support element, especially for use with a controlled deflection roll, which support element is relatively simple in construction and design, extremely reliable in operation, not readily subject to breakdown or malfunction, and requires a minimum of maintenance and servicing.

The hydrostatic support or pressure elements employed in controlled deflection rolls, for instance of the type disclosed in U.S. Pat. No. 3,802,044, granted Apr. 9, 1974, allow for a contact-free support of the roll shell upon a fixed roll support or beam, and specifically, independent of whether the roll shell is rotating or stationary, since they are not dependent upon the formation of a hydrodynamic lubricant film. However, with such constructions of controlled deflection rolls there arises, because of the bearing gap which has formed, a flow of the hydraulic medium through the bearing gap, resulting in a certain consumption in the pressurized fluid medium.

In normal fields of application this consumption is usually tolerated, since, on the one hand, the bearing gap which forms ensures for a wear-free running of the roll shell, and, on the other hand, an extremely modest frictional resistance, resulting in extremely lower drive power for the controlled deflection roll.

In the case of a controlled deflection roll which is heated with hot oil, as the same has been disclosed in the commonly assigned copending United States patent application Ser. No. 107,135 filed Dec. 26, 1979 now U.S. Pat. No. 4,282,639, granted Aug. 11, 1980 and United States patent application Ser. No. 107,134, filed Dec. 26, 1979, now U.S. Pat. No. 4,282,638, granted Aug. 11, 1980 there exists however, the circumstance that, on the one hand, the controlled deflection roll should be heated with extremely hot oil in a temperature range of about 250° C. to 300° C., whereas, on the other hand, the pressurized oil of the support or pressure elements, which should be brought to a pressure of 50 to 100 bar by normal pump systems, should not have such high temperatures. The pressurized oil escaping from the support elements, the quantity of which for each support element amounts to 1 to 2 liters per minute, therefore would degrade the heating effect of the hot oil.

Accordingly, the hydrostatic support or pressure element of the present development, which solves this problem is generally manifested by the features that the surface of a sealing surface is a sealing ledge and measured in the direction of the pressure gradient possesses a width which does not exceed 10 millimeters. Furthermore, the magnitude of the hydraulically effective surfaces of the punch, which govern the force by means of which the sealing surface of the sealing ledge is pressed against the running surface of the supported part or element, is chosen such that there is formed a contact or press force which is just sufficient in order to enable a predetermined relatively modest efflux of the pressurized fluid medium between the sealing surface of the sealing ledge and the running surface of the supported part.

Due to this measure the support or pressure element known from the aforementioned U.S. Pat. No. 3,137,530 is transformed such that, on the one hand, there is avoided the formation of a bearing gap between the closure ledge and the supported part, and, on the other hand, there is however produced a contact force by the closure ledge which now has been converted into a sealing ledge. By means of this contact or press force there is formed a mixed friction between the sealing surface of the closure ledge and the running surface of the supported part, which, on the one hand, ensures for an extremely low consumption of the pressurized fluid medium and, on the other hand, also ensures for a practically wear-free running of both surfaces.

The sealing surface preferably can have a width which does not exceed 5 millimeters. Consequently, with adequate sealing action the frictional resistance or friction between both of the mutually moved surfaces, which for instance in the case of controlled deflection rolls prevails in the form of a resistance of the roll shell against rotation, is reduced.

The hydraulically effective surface of the plunger, producing a contact force for the sealing surface, preferably can be identical to a surface whose boundary line extends within the sealing surface. In this way it is possible to obtain a construction wherein the contact force of the plunger of the support element is limited to a desired low value.

In the case of a support or pressure element having a cylindrical guide surface at the plunger as well as a circular ring-shaped sealing surface of the sealing ledge, it is possible, according to a further manifestation of the invention to have the diameter of the guide surface, governing the hydraulically effective surface, equal to the diameter of a circular-shaped line or arc extending through the sealing surface and coaxial thereto. This arc or circular-shaped line extends from the inner edge of the sealing surface which confronts the pressure chamber at a spacing of 0.2 to 0.5-fold the width of the sealing surface. Consequently, in this special case there is obtained a further precision of the force effective at the sealing surface, and specifically, with the intent of obtaining as small as possible contact or press force which, with adequate sealing action, ensures for a small frictional resistance and negligible wear of the sealing surface.

Moreover, the sealing ledge can be inserted into a groove of the plunger. In this case it possesses the shape of a sealing ring which can be fabricated from a material which differs from the material of the plunger. However, it should be specifically understood that the sealing ledge along with the plunger can be fabricated of one-piece or integrally.

In the case of a sealing ledge which is inserted into a groove of the plunger or the like the sealing action preferably can occur between the plunger and the sealing ledge along the inner surface of the sealing ledge which confronts the pressure chamber or space. In this way there in prevented that the pressure of the pressurized fluid medium effective in the pressure chamber will arrive below the ledge and, under circumstances, can cause a leakage flow, since by virtue of its pressure it can lift the sealing ledge from its seat in the groove.

The sealing ledge can be supported at its end located in the groove upon an elastic part or element which is effective in the direction of displacement or stroke of the plunger. Consequently, there is afforded a relatively faultless accommodation of the shape of the sealing ledge to the shape of the running surface coacting therewith, for instance the roll shell, and specifically, even upon deformation of this part. The support can be accomplished either through an inserted soft sealing ring or by providing a particularly elastic construction of the sealing ledge.

According to a special constructional embodiment the sealing ledge can possess an inner conical surface having upwardly directed cone tip or apex. By virtue of these measures there is obtained the beneficial result that upon wear of the sealing surface the diameter of the sealing ledge is enlarged, resulting in a reduction of the contact or press force, and specifically, with suitable construction of this arrangement for such length of time until there has adjusted such a small contact force that the wear stops.

With all of these embodiments the pressure chamber of the plunger can be subdivided by a partition or separation wall into two parts. At the partition wall there is located a throttle bore which flow communicates both such parts or chamber sections. By virtue of this measure, when the device equipped with the hydrostatic support elements is placed into operation, for instance a controlled deflection roll by way of example and not limitation, there is obtained pressing of the plunger against the running surface of the supported part, whereupon then there first arises the desired force conditions.

The same effect can also be obtained in that there is arranged a spring or equivalent resilient element between the supporting part and the plunger. This spring presses the plunger against the running surface of the supported part. Also by virtue of this design there is obtained a contact of the sealing surface of the sealing ledge at the running surface of the supported part, so that when placing into operation the equipment the pressurized fluid medium can not flow out undisturbed, and there arise the desired force conditions.

As already mentioned, the support or pressure element can serve for supporting the roll shell of a controlled deflection roll upon the roll support or beam. In this case it is arranged at the roll support of the controlled deflection roll and coacts by means of its sealing surface with the inner cylindrical surface of the roll shell which is rotatable about the roll support.

Preferably, the sealing ledge can be fabricated of a suitable plastic material which is temperature-resistant and possesses good running properties with marginal lubrication.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a sectional view of a controlled deflection roll at which the teachings of the invention can be utilized;

FIG. 2 is a sectional view of the hydrostatic support element shown in the arrangement of controlled deflection roll of FIG. 1 and on an enlarged scale;

FIG. 3 is a sectional view, corresponding to the showing of FIG. 2, of a different embodiment of support or pressure element;

FIG. 4 is sectional fragmentary view of the arrangement of FIG. 2 on an enlarged scale and illustrating a somewhat modified form of sealing ledge;

FIGS. 5 and 6 are sectional illustrations, corresponding to the showing of FIG. 4, depicting further embodiments of sealing ledges and their arrangement in the plunger of the support element;

FIG. 7 is a sectional view corresponding to the showing of FIG. 2 of a different embodiment of support or pressure element;

FIG. 8 is a possible plan view of the arrangement of FIG. 7;

FIGS. 9 and 10 respectively show diagrams for explaining the pressure conditions at the sealing ledge of the support element; and FIG. 11 illustrates a further apparatus at which there can be advantageously used the inventive constructions of pressure or support elements.

DETAILED DESCRIPTION OF THE PREFERRED EMBODIMENTS

Describing now the drawings, FIG. 1 illustrates in schematic sectional view a controlled deflection roll of the type described in the aforementioned United States patent application Ser. No. 107,134 filed Dec. 26, 1979, now U.S. Pat. No. 4,282,638, granted Aug. 11, 1980 to which reference may be readily had and the disclosure of which is incorporated herein by reference. The controlled deflection roll of such copending application contains a stationary roll support or beam 1 about which there is rotatable a substantially tubular-shaped roll shell 2. Attached at the roll support 1 are compartments or chambers 3 which have infed thereto, for instance, heated oil by means of any suitable and therefore not particularly illustrated pipe lines or conduits. The infed oil effluxes through the exit or outlet openings 4 in the form of compact jets 5 which impact against the inner wall 6 of the roll shell 2 and intensively heat such roll shell. The hot oil serving as a heat carrier is withdrawn by not particularly illustrated, suitable outfeed lines or conduits from the intermediate chamber or space 7 between the roll support 1 and the roll shell 2. As to the further details concerning such construction of controlled deflection roll reference may be made to the aforementioned U.S. Pat. No. 4,282,638.

As further evident by reverting to FIG. 1, parallel bores 8 or equivalent pockets or recesses are formed in the roll support 1 at a uniform spacing from one another. Sealingly guided with play in such bores 8 and so as to be laterally inclineable are the plungers or punches 10 or equivalent structure. For this purpose a seal 12 is arranged in a suitable groove 11 in the stationary roll support 1.

The substantially cylindrical bore 8 is flow communicated by a connection channel 13 with a central bore 14 of the roll support 1, which in this case has infed thereto, by means of a line or conduit 15, pressurized oil at a regulated pressure with the aid of a feed or delivery pump 16 and a pressure regulator 17. In the central bore 14 of the roll support 1 there are also housed the pipes or conduits 18, by means of which pressurized oil at a different pressure can be infed to further support or pressure elements 10, and specifically, with the aid of further pressure regulators which can be connected to the same feed or delivery pump 16.

FIG. 2 illustrates a sectional view of the plunger 10 with the neighboring portions of the controlled deflection roll, and as a matter of convenience there have been used the same reference characters as in FIG. 1 to denote the same or analogous components.

As will be seen by inspecting FIG. 2, the plunger 10 is constructed to be tubular-shaped and is provided with an outer guide surface 20 by means of which it is guided in the seal or seal means 12. At its end confronting the roll shell 2 the plunger 10 is provided with a substantially ring-shaped groove 21 in which there is arranged a substantially ring-shaped closure ledge 22 supported upon an elastic support ring or ring member 23. Within the internal bore 24 of the punch or plunger member 10 there is located a partition or separation wall 25 having a throttle bore 26.

As also will be evident by reverting to FIG. 2, the cylindrical guide surface 20 of the punch member 10 has a diameter D. The closure ledge or equivalent structure has an internal diameter d. Between both diameters there exists a difference of 2e, wherein this difference has only been particularly designated in FIG. 2 at one side of the plunger or punch member 10.

During operation hydraulic pressurized fluid medium, preferably pressurized oil, is infed through the central bore 14 and the connection channel or duct 13 into the cylindrical bore 8 at a pressure governed by the pressure regulator 17. If following standstill of the controlled deflection roll the plunger 10 should be lowered downwardly in the showing of FIG. 2 in a manner such that the closure ledges 22 do not contact the running or travelling surface 6 of the roll shell 2, then initially the infed pressurized oil will collect at the lower part of the bores 24 of the pressure or support elements and, since this further flow is limited by the throttle bores 26, the plungers 10 will be raised until their closure ledges 22 contact the running surface 6 at their sealing surfaces 22'. Thereafter the pressurized fluid medium, here the pressurized oil, flows through the throttle bore 26 in each case into the upper portion of the related bore 24, displaces the air located therein until also at the uper portion of the bore 24 there is formed, under the influence of the sealing surface 22', the same pressure as in the lower part of the bore 24. Since the diameter D is always greater than the diameter d there prevails a force which is upwardly directed, by means of which the sealing surface 22' is pressed against the running surface 6 of the roll shell 2, so that the closure ledge 22 functions as a sealing ring and prevents any appreciable outflow of the pressurized fluid medium from the bore 24 towards the outside. At the same time the pressurized fluid medium is effective at its full pressure upon the surface of the roll shell located within the diameter d and supports such by means of this force or pressure.

In a practical design and for the purpose of obtaining as small as possible friction and thus also small wear, the difference e should be maintained as small as possible, in order thereby to also realize a small contact force within the sealing surface 22'. The corresponding relationships of the diameter and the pressures will be explained based upon the illustrations of FIGS. 9 and 10.

According to FIG. 9 it is assumed that the difference e is chosen to be so large that a boundary line L, corresponding to the diameter D, at the running surface 6 is located at the region of such running surface, and specifically, approximately at its center. Stated in another way, this means that the radial width B of the running surface 6 is equal to 2e. According to the showing of FIG. 9 a force then is effective from below at the closure ledge 22, this force being governed by the pressure p of the hydraulic pressurized fluid medium and the ring or annular surface having the width e. This force acts opposite to a force which prevails along the sealing surface 22'.

With the usual assumption of a linear pressure gradient having a triangular pressure course according to a line M the forces acting upon the closure ledge 22 from below and from above are of the same magnitude, so that there is not produced any contact or press force acting upwardly in the showing of FIG. 9 against the running surface 6 of the roll shell 2. When assuming that there is present a triangular pressure distribution it is necessary in order to obtain the contact or press force for the difference e to be greater than 0.5 B.

Now in reality when working with good coacting sealing surfaces the pressure does not proceed according to the line M rather according to a curve N, and it descends more steeply from the inside of the closure ledge 22 than according to the straight line M. The white surface illustrated in FIG. 9 between the line M and the curve N results in an upwardly directed resultant force which is effective at the sealing surface 22', which also further results in a positive contact or press force even with a value of the difference e smaller than 0.5 B.

In accordance with the illustration of FIG. 10 the difference e can be reduced to a value amounting to 20% of B, without thereby losing the sealing action between the sealing surface 22' and the running surface 6 of the roll shell 2. The thus prevailing extremely small contact force has the advantage that there is present a small friction and also small wear of the sealing surface 22'.

Thus in the case of support elements having a diameter d=100 mm at pressures of 50 to 100 bars there were measured effluxing quantities of oil of 0.1 to 2 liters per hour, in contrast to 1 to 2 liters per minute in the case of support elements designed according to the aforementioned U.S. Pat. No. 3,802,044 with hydrostatic lubrication between the support element and the roll shell.

As also will be apparent from the showing of FIGS. 9 and 10, the lower surface 30 of the closure ledge 22 is bevelled or inclined such that it forms an inner edge K having an angle of less than 90°, which cuts into the elastic support or underlay 23.

Due to these measures there is realized the beneficial result that the sealing action between the closure ledge 22 and the remaining plunger 10 is accomplished along the line K and therefore along the inner surface 31 of the closure ledge 22. Consequently, there is effectively prevented any penetration of the pressurized fluid medium below the closure ledge 22 and any lift-off thereof from the underlay or support 23.

With the embodiment of FIG. 3, with otherwise similar conditions, here the partition or separation wall 25 is replaced by a spring 35. This spring 35 presses the plunger or punch 10 constituting the pressure or support element upwardly against the roll shell 2 and thus ensures for contact of the closure ledge 22 at the inner or running surface 6 at the roll shell 2, so that upon infeed of the pressurized fluid medium there can be accomplished the desired supporting function.

With the embodiment of FIG. 4 the sealing ledge 22 is provided externally of the groove 21 with a conical surface 40 having an upwardly directed, not particularly referenced cone tip or apex, which convergingly tapers or narrows from the diameter d to a diameter d'. At the outer side of the closure ledge 22 there can be located an appropriately configured conical surface 40'. With this design, because of the smaller diameter d', there is obtained at the start a greater contact force in the sealing surface 22'. In the event that this leads to wear then the diameter d' increases to the diameter d, wherein with proper selection of the dimensions it is possible to totally inhibit the further wear.

The embodiment of FIG. 5 differs from the preceeding embodiments in that the closure ledge 22 is provided with a sealing ring 50 embedded therein. The gap between the closure ledge 22 and the plunger 10 is sealed by a sealing ring 51. The elastic support or underlay 23, shown in FIG. 2, is here replaced by a plate spring 52.

With the embodiment of FIG. 6 the closure ledge or ledge member 22 is provided at its lower region of its cross-section with two recesses or cut-outs 60 which impart to this section or region of the closure ledge 22 an additional elasticity. Consequently, with this design it is possible to dispense with the use of the elastic support or underlay 23. Also here there is accomplished the sealing action towards the base of the groove 21 along the inner edge K (see also FIG. 10).

FIG. 7 illustrates a variant embodiment wherein the cylindrical bore 8 is not formed in the roll support 1 rather in the support element, i.e., the plunger or punch 10. Extending into the bore 8 is a piston-like part 10' in which there is located the seal or seal means 12. The guide surface 20 is formed by the bore 8 of the plunger or punch 10.

With the variant embodiment of FIG. 7, just as was also the case for the embodiment of FIG. 2, the design of the plunger, instead of having a cylindrical configuration, can have the shape of an elongate ledge member. Such type embodiment has been illustrated in FIG. 8 which should be considered in conjunction with the sectional view of FIG. 7. As indicated in FIG. 8 by the broken line L (see also FIG. 9), also in this case the boundary determined by the guide surface 20 is located within the sealing surface 22' of the ledge or ledge member 22.

However, it should be understood that the guide surface, with the same surface area, also could be for instance cylindrical.

Ledge-shaped support elements of the type shown in FIG. 8 can be used in the same manner as cylindrical or piston-like support or pressure elements in controlled deflection rolls of the type disclosed in conjunction with FIG. 1. In this case an elongate ledge-shaped support or pressure element replaces in each instance a number of adjacently located cylindrical support or pressure elements. However, it is also conceivable to employ the inventive support or pressure elements in other equipment than controlled deflection rolls.

Therefore, in FIG. 11 there has been shown by way of example and not limitation, a band or belt press containing two elastic bands or belts 100, for instance formed of steel, which are guided over guide cylinders 101 or equivalent structure. The press is equipped with two support or pressure elements 102 which can be designed in the manner heretofore described. Between the bands or belts 100 there can be guided webs which are to be pressed, for instance paper webs, which then are pressed between the support or pressure elements 102.

While there are shown and described present preferred embodiments of the invention, it is to be distinctly understood that the invention is not limited thereto, but may be otherwise variously embodied and practiced within the scope of the following claims. Accordingly,

What we claim is:

1. A hydrostatic support element, especially for a controlled deflection roll, for supporting a supported part upon a supporting part, comprising:
   a plunger member movable at the supporting part in a predetermined displacement direction;
   said plunger member coacting with the supporting part for enclosing a hydrostatic pressure chamber to which there is infed a pressurized fluid medium;
   said supported part having a running surface;
   the pressurized fluid medium acting directly upon the running surface of the supported part;
   said plunger member possessing a closure ledge surrounding the pressure chamber;
   said closure ledge having a surface coacting with the running surface of the supported part;
   said surface comprising a sealing surface of a sealing ledge and measured in the direction of pressure gradient of the pressurized fluid medium having a width which does not exceed 7 mm;
   said plunger member possessing a groove;
   said sealing ledge being inserted into said groove;
   said plunger member having hydraulically effective surface means of a dimension such as to determine the force by means of which the sealing surface of the sealing ledge is pressed against the running surface of the supported part;

the size of the hydraulically effective surface means of the plunger member being chosen such that there is formed a contact force which is just sufficient in order to permit a predetermined low escape of the pressurized fluid medium between the sealing surface of the sealing ledge and the running surface of the supported part; and a sealing means between the plunger member and the sealing ledge along an inner surface of the sealing ledge which confronts the pressure chamber.

2. The hydrostatic support element as defined in claim 1, wherein:

said sealing surface has a width which does not exceed 5 mm.

3. The hydrostatic support element as defined in claim 1, wherein:

said plunger member possesses a substantially cylindrical guide surface;

said sealing ledge having a substantially ring-shaped sealing surface;

the diameter of the guide surface which governs said hydraulically effective surface means is essentially equal to the diameter of a substantially circular-shaped line extending through the sealing surface and arranged coaxially with respect to such sealing surface; and said circular-shaped line extending from an inner edge of the sealing surface which confronts the pressure chamber at a distance of 0.2 to 0.5-fold the width of the sealing surface.

4. The support element as defined in claim 1, wherein:

said sealing ledge is provided with an elastic element at its end located in said groove; and said elastic element being effective in the displacement direction of the plunger member.

5. The hydrostatic support element as defined in claim 1, wherein:

said sealing ledge possesses an inner substantially conical surface having an upwardly directed cone tip.

6. The hydrostatic support element as defined in claim 1, further including:

a partition wall for separating the pressure chamber of the plunger member into two parts; and said partition wall having a throttle bore which flow communicates both parts of said pressure chamber.

7. The hydrostatic support element as defined in claim 1, further including:

a spring arranged between the supporting part and the plunger member; and said spring pressing the plunger member against the running surface of the supported part.

8. The hydrostatic support element as defined in claim 1, wherein:

said hydrostatic support element is arranged at a roll support of a controlled deflection roll;

said roll support constituting said supporting part;

said sealing surface coacting with an inner cylindrical surface of a roll shell of the controlled deflection roll which is rotatable about the roll support; and said roll shell constituting said supported part.

9. The hydrostatic support element as defined in claim 1, wherein:

said sealing ledge is formed of a plastic material which is temperature resistant and possesses good running properties with marginal lubrication.

10. The hydrostatic support element as defined in claim 1, wherein:

said hydrostatic support element is used in conjunction with a heated controlled deflection roll to minimize the amount of said pressurized fluid medium which comes into contact with a heated fluid medium used for heating of the heated controlled deflection roll.

* * * * *